Nov. 12, 1940.                A. KLEIJN                 2,221,640
        APPARATUS FOR TESTING THE QUALITY OF GRAIN AND FLOUR
                       Filed Nov. 4, 1938
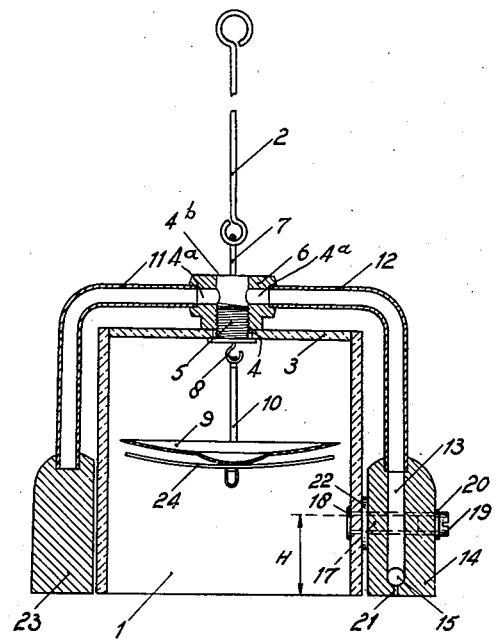
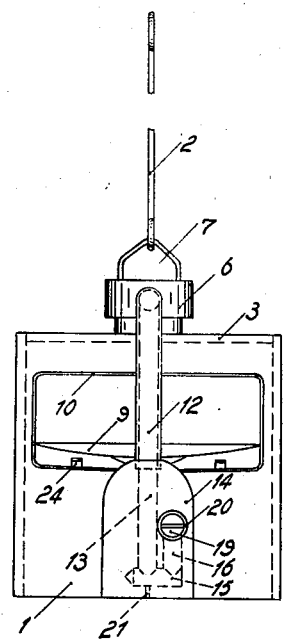
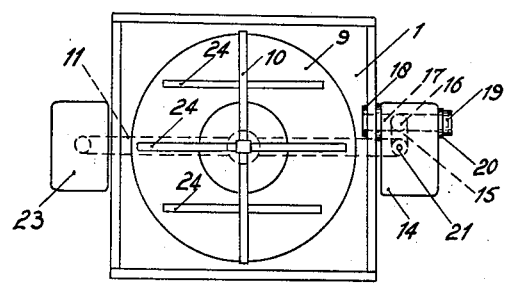
Inventor:
Adrianus Kleijn,
By his Attorneys,
Fraser, Myers & Manley Patented Nov. 12, 1940

2,221,640

UNITED STATES PATENT OFFICE 2,221,640

APPARATUS FOR TESTING THE QUALITY OF GRAIN AND FLOUR

Adrianus Kleijn, Rotterdam, Netherlands

Application November 4, 1938, Serial No. 238,741
In Great Britain December 10, 1937

5 Claims. (Cl. 23—253)

The present invention relates to an apparatus for testing the quality or the condition of grain and flour by measuring the amount of gas developed in the fermentation process.

This may for example be obtained by arranging a ball of dough or grain within an inverted bell or a bell-shaped hood, formed for example of glass, and suspending this bell or hood submerged in a liquid at one arm of a balance; the liquid level in the inverted bell should be at a predetermined height above the lower edge of the bell so that the gas developed by the fermentation remains enclosed in the bell. Now the total weight is determined, first immediately at the beginning of the fermentation process, and further after the fermentation has taken place. From the difference in weight the amount of gas developed by fermentation within the bell is determined; said amount forms an indication for the quality of the grain or the flour.

The invention relates to a device by which the carrying out of the above measuring process is substantially facilitated, and which is characterised by the provision of a bell adapted to be suspended in such a position that its open side is directed downwardly; the interior of said bell is connected in such a manner with the surrounding space that, when the bell is immersed, the liquid can only rise to a predetermined level, but is again pressed out of the bell under the action of an overpressure created in the interior of the bell. This is attained by providing a passage or a channel in the bell one end of which opens to the inner side of the bell at a certain distance above the lower edge of the bell, and the other end of which is at the upper part of the bell connected with the outer air. The passage may, according to the invention, comprise a U-shaped portion extending to the lower end of the bell and forming there a liquid closure. The lower end of this U-shaped portion may further be provided with an opening of considerably smaller cross-section than the cross-section of the passage.

According to the present invention the bell used for performing the method above described for this purpose may be provided with fixation or clamping means for the fixation of a container or a fabric saturated with a suitable absorbent such as e. g. potash lye.

For this purpose a fabric of asbestos may be used, fixed in a support of adequate shape, which may be applied in any suitable manner in the bell, preferably to the dish or the like receiving the dough or the grain to be tested.

Further constructional forms of the invention will be described hereinbelow.

In order that the present invention should be readily understood, a constructional example, according to the invention, shall now be described with reference to the accompanying drawing in which:

Fig. 1 shows a longitudinal section of a construction of the bell for testing the quality of grain and flour.

Fig. 2 shows a side view of the same device.

Fig. 3 is a plan view from below of the device shown in Figs. 1 and 2.

Referring to Figs. 1–3 the device comprises a bell or hood 1 of square form, composed of five small glass sheets cemented together at their borders and leaving the bottom side open. This shape of the bell has the advantage that the ball of dough remains well visible during the whole process, the visual impression being not disturbed in consequence of the shape of the walls of the hood, as it is the case with a bell of cylindrical form.

The bell may be suspended by means of wire rods 2 on the arm of a balance. The top plate 3 is provided in its centre with a hole 4, closed by a screw 5, passing through said hole and extending in a connecting member 6 provided for this purpose with a central hole with screw thread. The member 6 is provided with a suspending loop 7.

The screw 5 has a suspending hook 8 or loop for suspending on it the dish 9, supported by a bow 10.

The member 6 is further provided with two diametrical holes 4a communicating with a central hole 4b, the upper end of which opens to the surrounding atmosphere. In said holes 4a the ends of bent pipes 11 and 12 are soldered. The lower end of the pipe 12 is soldered in a passage 13 of a connecting member 14 and by means of further passages 15, 16 and 17 the pipe 12 communicates with the inner space of the bell 1. The passage 17 is constituted by a short pipe inserted in the member 14 and extending through a hole in the side wall of the bell, where it is provided with a flange 18. The outer end of said pipe is provided with inner screw thread and is closed by a screw plug 19 with washer 20. The passages 13, 15 and 16 further communicate with a passage 21 of substantially smaller diameter and in this way with the atmosphere or with the liquid into which the bell is immersed. Between the member 14 and the bell 1 an intermediate layer 22 of suitable material is provided. The other tube 11, which is located symmetrically with respect to the tube 12 is provided with a counterweight 23 of such dimensions that when suspended the device will take a quite symmetrical position.

The pipes or passages 12, 13, 15, 16, 17 or a part of them may also form part of the bell wall and in the example of a glass bell may be cast in it or on to it.

The dish 9 is provided with clamping members 24 for the fixation of a fabric containing some absorbent for absorbing the carbon dioxide developed during fermentation.

In testing the quality or the condition of grain or flour by using the apparatus according to the invention, it may be proceeded in the following way. When it is intended to determine the total production of gas the method is the following:

When the dough or grain ball has been put on to the dish 9, the latter is placed under the bell which then is suspended on the balance and relatively quickly immersed into a container containing for example paraffin. The liquid rising into the bell from below will displace the air contained therein (which will escape through pipe 17 and pipe 12 at the top of the bell) until the liquid in the bell has risen to the height H above the edge of the bell. During the immersing, liquid will also enter through the narrow passage 21 into the pipes 13, but the rate of flow will not be sufficient for preventing the air from escaping out of the interior space of the bell through pipe 17, 16 and pipe 12. The paraffin gradually rising through the narrow hole 21 up to the height H when the air has escaped will then form a closure in the pipes 17 and 12.

The gas developed owing to the fermentation is thus located in an entirely closed space. The level of the liquid will gradually descend in the bell 1 itself as well as in the pipe 16 owing to the development of gas.

Measuring of the weight of the bell immersed into the liquid is effected at the beginning of the fermentation process and when the gas developed has reached its maximum amount. The difference in weight determines the amount of gas developed owing to the fermentation and therefore also the quality of the dough mass.

For measuring the capacity of retaining gas, before immersing the bell in the liquid an absorbent, such as potash lye is introduced into the inner space of the bell. Preferably a suitable fabric, e. g. of asbestos is saturated with the absorbent material and fixed between the dish 9 and the clamps 24. The dish is then fixed in the bell and the latter is suspended on the balance and immersed in the liquid, which preferably may be water, to which a small quantity of a weak acid, such as e. g. lactic acid, has been added.

The liquid will displace a part of the air contained in the bell, which escapes through the pipes 17, 16, 15, 13 and the hole 4 in the member 6 at the top of the bell 1. As soon as the level of the liquid in the bell will have reached the height H it will form a liquid closure so that the air in the bell will no longer be in communication with the atmosphere. The gas developed owing to the fermentation is thus contained in a closed space and may be absorbed by the asbestos fabric saturated with a suitable absorbent.

What I claim is:

1. Apparatus for testing the quality of dough, grain or like material, comprising a bell, means for suspending said bell with its open side directed downwardly and completely submerged in liquid, means for supporting a quantity of such material within said bell and a passage, opening at a lower end into said bell at an intermediate level thereof and opening at an upper end into the exterior air at a point near the top of the bell, whereby to permit liquid to rise within the bell to a point substantially coincident with the said lower end of said passage when the bell is submerged, and the said passage having a portion adapted to retain liquid therein while the open side of the bell remains submerged, whereby to permit the expansion of gas within the bell while preventing its escape therefrom.

2. Apparatus according to claim 1, further characterized in that the portion of the said passage adapted to retain liquid therein is U-shaped and extends substantially to the bottom of the bell, and in that the lower end of the said U-shaped portion has an opening, substantially narrower in cross-section than said passage, affording communication between the interior of the latter and the exterior of the bell at the bottom thereof.

3. Apparatus according to claim 1, further characterized in that the said passage comprises a pipe, and a connecting member connecting said pipe with the interior of the bell at a certain distance above the lower edge of the bell, and in that the said pipe and connecting member are disposed toward one side of the bell and a similar pipe and a weight are disposed at the opposite side of the bell whereby to maintain the bell in a symmetrical position when suspended.

4. Apparatus according to claim 1, further characterized in that the said means for supporting a quantity of material within the bell comprises a readily removable dish, disposed at an intermediate level within the bell and in that the said passage opens into said bell at a level intermediate the said dish and the plane of the bottom of the bell.

5. Apparatus according to claim 1, further characterized in that means are provided within the bell for holding absorbent material adapted to absorb gas developed owing to the fermentation of the material being tested.

ADRIANUS KLEIJN.